United States Patent
Cerniglia (10) Patent No.: US 7,229,269 B2
(45) Date of Patent: Jun. 12, 2007

(54) SLIDE RETAINING DEVICE AND METHOD OF INSTALLATION

(75) Inventor: Anthony J. Cerniglia, Wauconda, IL (US)

(73) Assignee: Progressive Components International Corporation, Wauconda, IL (US)

(*) Notice: Subject to any disclaimer, the term of this patent is extended or adjusted under 35 U.S.C. 154(b) by 50 days.

(21) Appl. No.: 10/997,434

(22) Filed: Nov. 24, 2004

(65) Prior Publication Data

US 2006/0013919 A1   Jan. 19, 2006

Related U.S. Application Data

(60) Provisional application No. 60/588,821, filed on Jul. 16, 2004.

(51) Int. Cl.
*B29C 45/33* (2006.01)
(52) U.S. Cl. .................. 425/192 R; 29/525.11; 425/441; 425/472; 425/577
(58) Field of Classification Search ............ 425/192 R, 425/214, 441, 472, 577; 29/525.11
See application file for complete search history.

(56) References Cited

U.S. PATENT DOCUMENTS 4,515,342 A * 5/1985 Boskovic ................ 425/577
4,765,585 A * 8/1988 Wieder .................... 425/192 R
5,397,226 A * 3/1995 Vandenberg ............. 425/192 R
6,443,723 B1 * 9/2002 Buttigieg .................. 425/577

FOREIGN PATENT DOCUMENTS

| JP | 8-90609 | * | 4/1996 |
| JP | 2000-346106 | * | 12/2000 |
| JP | 2001-18262 | * | 1/2001 |

* cited by examiner

Primary Examiner—James P. Mackey
(74) Attorney, Agent, or Firm—Law Office of Marc D. Machtinger, Ltd.

(57) ABSTRACT

A slide retaining device for an injection mold is disclosed. The slide retaining device has a device body which has a top surface and a bottom surface. A live bearing can be mounted in the device body such that a portion of the live bearing extends above a top surface of the device body. The device is secured such that the live bearing supports the travel of a slide. A shoulder surface is formed where a body head portion interfaces with a body base portion. A spring is disposed is around the body base portion such that a spring top is in communication with the shoulder surface, and a spring bottom extends below the bottom surface of the device body. The spring creates a "pre-load" force that will hold the slide in place. Optional washers can be added to the device to adjust the "pre-load".

17 Claims, 7 Drawing Sheets

SLIDE RETAINING DEVICE AND METHOD OF INSTALLATION

CROSS-REFERENCE TO RELATED APPLICATIONS

This application claims the benefit of U.S. Provisional Patent Application No. 60/588,821, filed Jul. 16, 2004, which is hereby incorporated by reference in its entirety.

BACKGROUND OF THE INVENTION

1. Field of the Invention

The present invention relates to injection molding devices, and more specifically to a device to retain a slide assembly portion of an injection mold.

2. Description of the Related Art

In typical injection molds, the mold cavity is created from plates that abut each other at a parting line. When the mold is opened, these plates move apart from one another such that the molded part can be removed or ejected. In many injection molds, the mold cavity is further defined by one or more pieces that move perpendicular to the plates as the mold is opened and closed. These perpendicularly moving pieces are attached to slides which typically are moved by angle pins. The angle pin is received through an angled bore extending through the slide. In normal opening movement of the mold, the angle pin forces the slide laterally away from the molded piece along a guided path.

It is desirable to retain the slide in the retracted position to prevent unintentional slide closure. Several slide retainers are known in the art. For example, U.S. Pat. No. 3,811,645, issued to Feist (Feist retainers), discloses a slide retainer and positioner. The retainer in Feist includes a set of spring-biased jaws that grip an element, such as a pin or rod, installed on the slide when the slide is moved to the open position.

Another type of slide retainer is disclosed in U.S. Pat. No. 5,397,226, issued to Vandenberg and assigned to the D-M-E Company of Madison Heights, Mich. (Vandenberg retainers). Vandenberg retainers are characterized by a circlular body having a lip section, and a flat key section formed on one side of the lip section. A plunger having an elongated rounded plunger head is received in a cavity formed in the body. A spring is held in the cavity by a threaded plug and biases the plunger head to extend up through an opening in the top of the body. The rounded plunger head is designed to mate with a groove formed in the bottom surface of the slide.

There are several drawbacks to slide retainers based on the Feist design. First, slide retainers having different holding strengths are not of uniform size, thus if the slide designer miscalculates the required necessary holding strength, a replacement slide retainer of greater or lesser holding strength will not fit in the pocket created for the original slide retainer. Furthermore, slide retainers according to the Feist design lack adjustability, meaning different retainers must be purchased for different holding strengths. Second, these slide retaining devices require complicated machining processes to facilitate their installation. Not only does the slide retainer have to be installed into a relatively large pocket, milled into the core plate of the injection molding machine, the pin or rod also has to be installed in the slide. Any misalignment of the retainer and the pin usually results in damage to the mold and mold components. Furthermore, the large pocket into which the slide retainer is installed takes up valuable space in the injection mold.

Similarly, there are several drawbacks to slide retainers based on the Vandenberg design. First, slide retainers having different holding strengths are not of uniform size, which leads to the same problems mentioned above. Like the Feist retainers, the Vandenberg retainers lack adjustability. Additionally, the installation process for the Vandenberg retainers requires complex milling operations, such as the milling for the lip section and key sections.

In addition to the cited slide retainers, there are other types of slide retainers commercially available. However, no commercially available slide retainers utilize a live bearing, which is a bearing that allows the slide to roll over the retainer until the slide reaches the end of its travel and is secured in place by the retainer.

There remains a need for a slide retaining device that offers improved retaining properties, adjustable retaining properties, a more compact size for improved installation and greater flexibility in mold design. Furthermore, there remains a need for a slide retaining device that employs a live bearing. Additionally, there remains a need for slide retaining device components that may be used to retrofit existing devices such that the improved slide retaining devices employ a live bearing.

SUMMARY

In view of the deficiencies described above, it is an object of the present invention to provide a slide retaining device that offers improved retaining properties It is a further object of the present invention to provide a slide retaining device that offers adjustable retaining properties.

It is a further object of the present invention to provide a slide retaining device that offers a more compact size than previous slide retaining devices.

It is a further object of the present invention to provide a slide retaining device that requires a less complicated milling and machining processes in order to install the slide retaining device.

It is a further object of the present invention to provide a slide retaining device that offers improved flexibility in mold design.

It is a further object of the present invention to provide a slide retaining device that has a live bearing device incorporated therein.

It is a further object of the present invention to provide a slide retaining device suitable for use in clean room and medical mold applications.

It is a further object of the present invention to provide slide retaining device components that may be used to replace or retrofit pre-existing slide retaining devices such that the improved slide retaining devices employ a live bearing.

It is a further object of the present invention to provide slide retaining device components that may be used to replace or retrofit pre-existing slide retaining devices such that the improved slide retaining devices offer adjustable retaining properties.

The present invention is a slide retaining device. The slide retaining device, has a device body which has a top surface and a bottom surface. A live bearing can be mounted in the device body such that a portion of the live bearing extends above the top surface of the device body. The device is secured such that the live bearing supports the travel of a slide. In various preferred embodiments, the live bearing is a roller, which can be mounted on an axel in the device body.

In various preferred embodiments, the device body has a body base portion and a body head portion. The body base portion has a first diameter. The body head portion has a second diameter greater than the first diameter. A shoulder surface is formed where the body head portion interfaces with the body base portion. A spring, which has a top and a bottom, is disposed is around the body base portion such that the spring top is in communication with the shoulder surface, and the spring bottom extends below the bottom surface of the device body. The spring creates a "pre-load" force that will hold the slide in place. Optional washers can be added to the device to adjust the "pre-load".

In other various embodiments, the device may be used without a live bearing. In these embodiments, a contact surface is formed into the top surface of the device body. A portion of the contact surface extends above the top surface of the device body. These embodiments may also include a spring of the type described above and optionally may include washers as described above.

The present invention also includes a method of installing a slide retaining device of the type described above. A flat bottom pocket is created in the part of the injection mold into which the slide retaining device is to be installed. Holes for shoulder screws are drilled and taped into the bottom of the flat bottom pocket using conventional operations known in the art. The slide retaining device is placed into the flat bottom pocket and secured with the shoulder screws. The shoulder screws provide alignment of the device. A groove is formed into a corresponding part of the injection molding machine, such that the groove releasably engages the slide retaining device.

Other features and advantages of the invention will be apparent from the following detailed description taken in conjunction with the following figures, wherein like reference numerals represent like features.

DETAILED DESCRIPTION OF THE INVENTION

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.

Figure 1A:
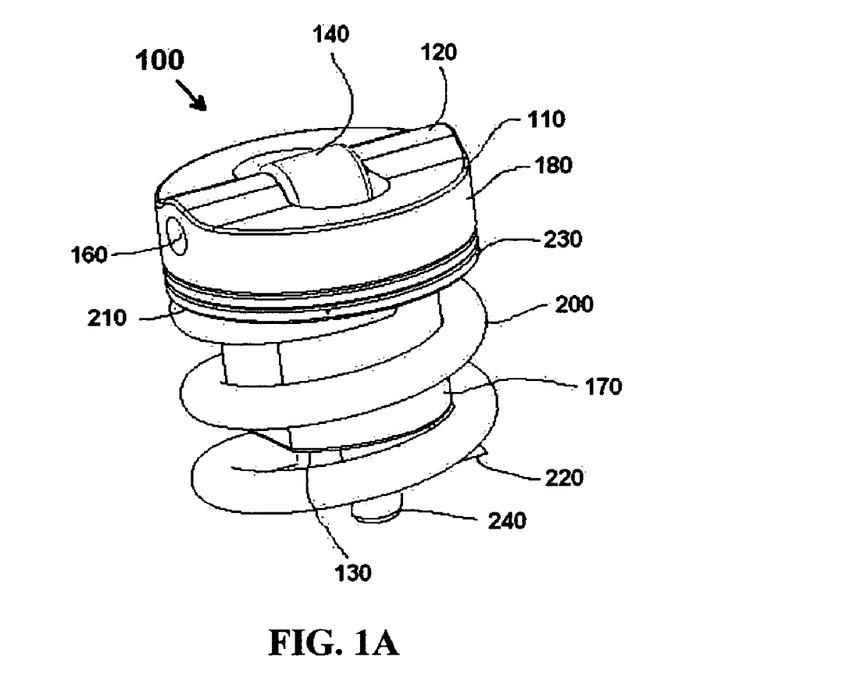
FIG. 1A shows a perspective view of a slide retaining device according to the present invention.
Figure 1B:
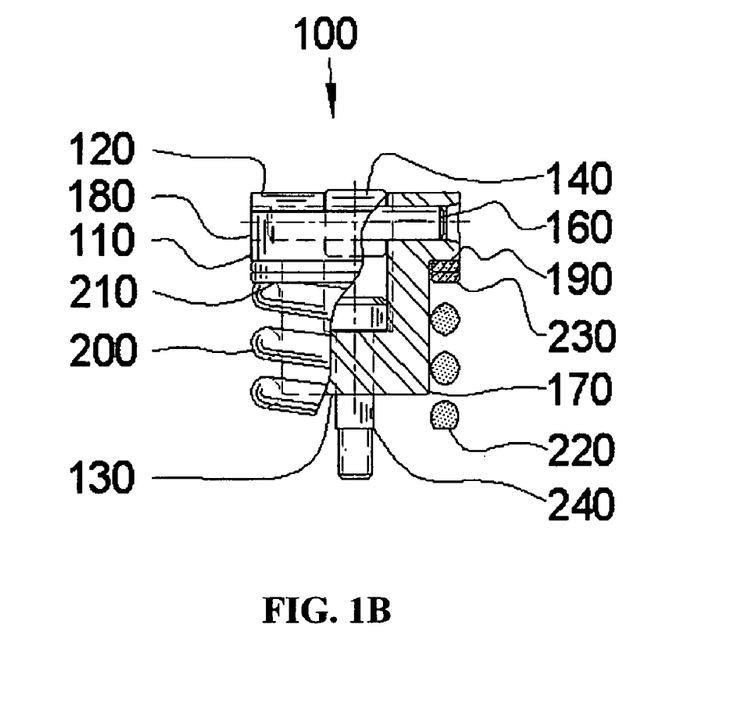
FIG. 1B shows section view of a slide retaining device according to the present invention.

The present invention is a slide retaining device. FIG. 1A shows a perspective view of a slide retaining device according to the present invention. FIG. 1B shows section view of a slide retaining device according to the present invention. The slide retaining device 100, has a device body 110 which has a top surface 120 and a bottom surface 130. A live bearing 140 can be mounted in the device body 110 such that a portion of the live bearing 140 extends above the top surface 120 of the device body 110. The device 100 is secured such that the live bearing 140 supports the travel of a slide 150, shown in FIGS. 2 and 3, and explained in detail below. In various preferred embodiments, the live bearing 140 is a roller, which can be mounted on an axel 160 in the device body 110. Live bearings 140 of other types known in the art may also be used, including, but not limited to, live bearings having needle bearings or incorporating similar bearing devices.

A live bearing 140 has several advantages. First, the use of a live bearing 140 reduces the risk of galling to the underside of the slide 150 or other injection mold 250 components in contact with the live bearing 140. Second, the use of a live bearing 140 may reduce or eliminate the need for lubricants to be used in the slide 150 action, which is desirable for clean room and medical mold applications. For example, in clean room and medical molding applications, the use of lubricants can be reduced or eliminated by using two or more slide retaining devices 100 having live bearings 140 according to the present invention to create a rolling surface for the slide 150. Furthermore, a slide retaining device 100 according to the present invention may be used to elevate the slide 150 above a shut-off level, which allows the slide 150 to be in position and then closed down during clamp up (the final stage of closing the mold), thereby creating a "butt shut-off" as the term is know in the art. By using a slide retaining device 100 according to the present invention in such a manner, the need for a shut-off angle in the line of draw is eliminated.

In various preferred embodiments, the device body 110 has a body base portion 170 and a body head portion 180. The body base portion 170 has a first diameter. The body head portion 180 has a second diameter greater than the first diameter. A shoulder surface 190 is formed where the body head portion 180 interfaces with the body base portion 170. A spring 200, which has a top 210 and a bottom 220, is disposed is around the body base portion 170 such that the spring top 210 is in communication with the shoulder surface 190, and the spring bottom 220 extends below the bottom surface 130 of the device body 110. The spring 200 creates a "pre-load" force that will hold the slide 150 in place.

Optional washers 230 can be added to the device 100 to adjust the "pre-load". The use of washers 230 allows the same device 110 to be used with slides 150 of different weights. Adjustability allows for error in calculation the weight of the slide 150 and or resistance from water hoses (not shown) or other items that make up the injection mold 250 and associated components. Adjustability also allows the same device 100 to be used, without redesign of the slide retaining device 100, should a revision to the part being manufactured or a revision to the injection mold 250 cause the weight of slide 150 to change. Furthermore, adjustability simplifies design of the injection mold 250 by only requiring a slide retaining device 100 of one size. Lastly, the use of washers 230 between the spring 200 and the shoulder surface 190 allows the spring 200 to rotate as the spring 200 is compressed and released, which reduces strain on the spring 200 and the device body 110.

In various embodiments, the device 100 is secured using one or more shoulder screws 240. Shoulder screws 240 are sometimes referred to as stripper bolts and are known in the industry. The shoulder screws 240 are used to hold the device 100 at or below surface level of the component into which the device 100 is installed such the first point of contact is the live bearing 140. Preferably, the shoulder screws 240 have a socket head or other common head to facilitate installation.

The device 100 of the present invention can be installed in various locations in an injection mold 250. For example, the device 100 can be mounted in a core plate 260 of an injection mold 250. In these instances, a groove 270 is formed in the slide 150 such that the groove 270 releasably engages the live bearing 140. In other instances, the device 100 can be mounted in the slide 150, with a corresponding groove 270 formed in the core plate 260.

Figure 4:
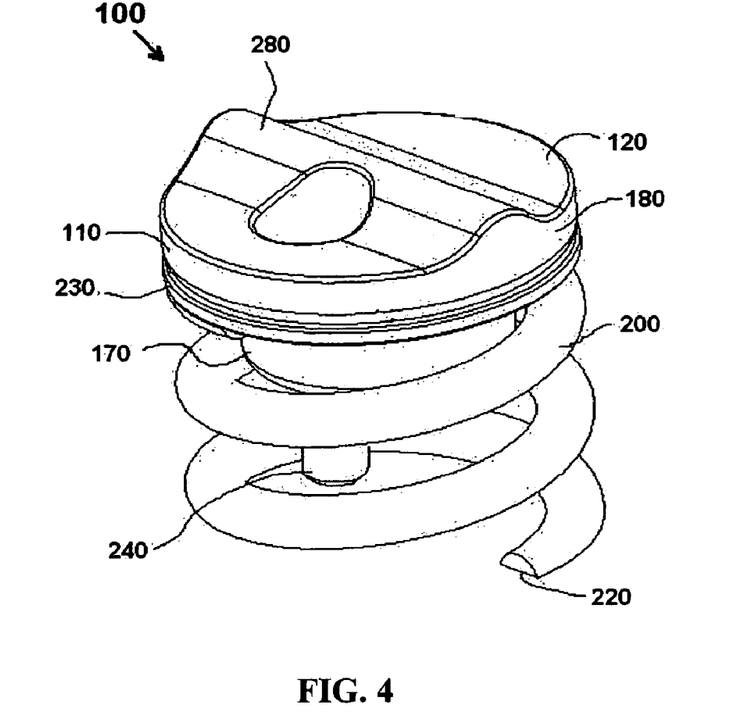
FIG. 4 shows a perspective view of a slide retaining device according to the present invention without a live bearing.

In other various embodiments, the device 100 may be used without a live bearing 140. FIG. 4 shows a perspective view of a slide retaining device according to the present invention without a live bearing 140. In these embodiments, a contact surface 280 is formed into the top surface 120 of the device body 110. A portion of the contact surface 280 extends above the top surface 120 of the device body 110. These embodiments may also include a spring 200 of the type described above and optionally may include washers 230 as described above. While elimination of the live bearing 140 negates the advantages of having a live bearing 140, the other advantages of the present invention remain.

The present invention also includes a method of installing a slide retaining device 100 of the types described above. A flat bottom pocket 290 is created in the part of the injection mold 250 into which the slide retaining device 100 is to be installed, for example, a core plate 260. The flat bottom pocket 290 can be formed using conventional operations known in the art, such as drilling or step drilling and milling a flat bottom bore. Preferably the slide retaining device 100 is sized such that the same device 100 may be used in both English and metric dimensioned injection molds 250. For example, a 0.875 inch bore and a 22 mm bore may be used for the same sized slide retaining device 100. Holes for the shoulder screws 240 are drilled and taped into the bottom of the flat bottom pocket 290 using conventional operations known in the art. The slide retaining device 100 is placed into the flat bottom pocket 290 and secured with the shoulder screws 240. The shoulder screws 240 provide alignment of the device 100. A groove 270 is formed into a corresponding part of the injection mold 250, such as a slide 150, such that the groove 270 releasably engages the slide retaining device 100. The groove 270 can be formed using conventional operations know in the art. Fox example, the groove 270 can be formed simply by using a ball end mill, and milling a predetermined depth and length groove 270.

Figure 2:
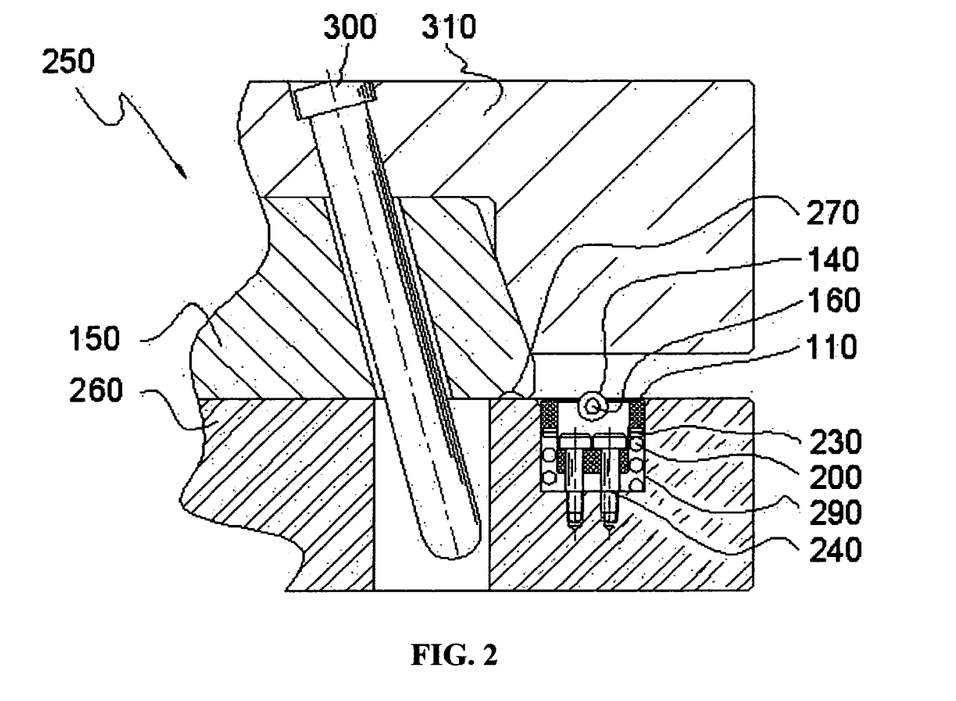
FIG. 2. shows a typical section view of an injection mold in the mold closed position having a slide retaining device according to the present invention.

FIG. 2. shows a typical section view of an injection mold 250 in the mold closed position having a slide retaining device 100 according to the present invention. The core plate 260, has a flat bottom pocket 290 milled, machined or otherwise formed in it. The slide retaining device 100 is secured into the core plate 260 via one or more fasteners, such as shoulder screws 240. An angle pin 300 is fixed to the cavity plate 310. The angle pin 300 passes through a hole in the slide 150. The slide 150 has a grove 270 milled, machined or otherwise formed into the slide 150, such that upon mold opening, the grove 270 will releasably engage the slide retaining device 100.

Figure 3:
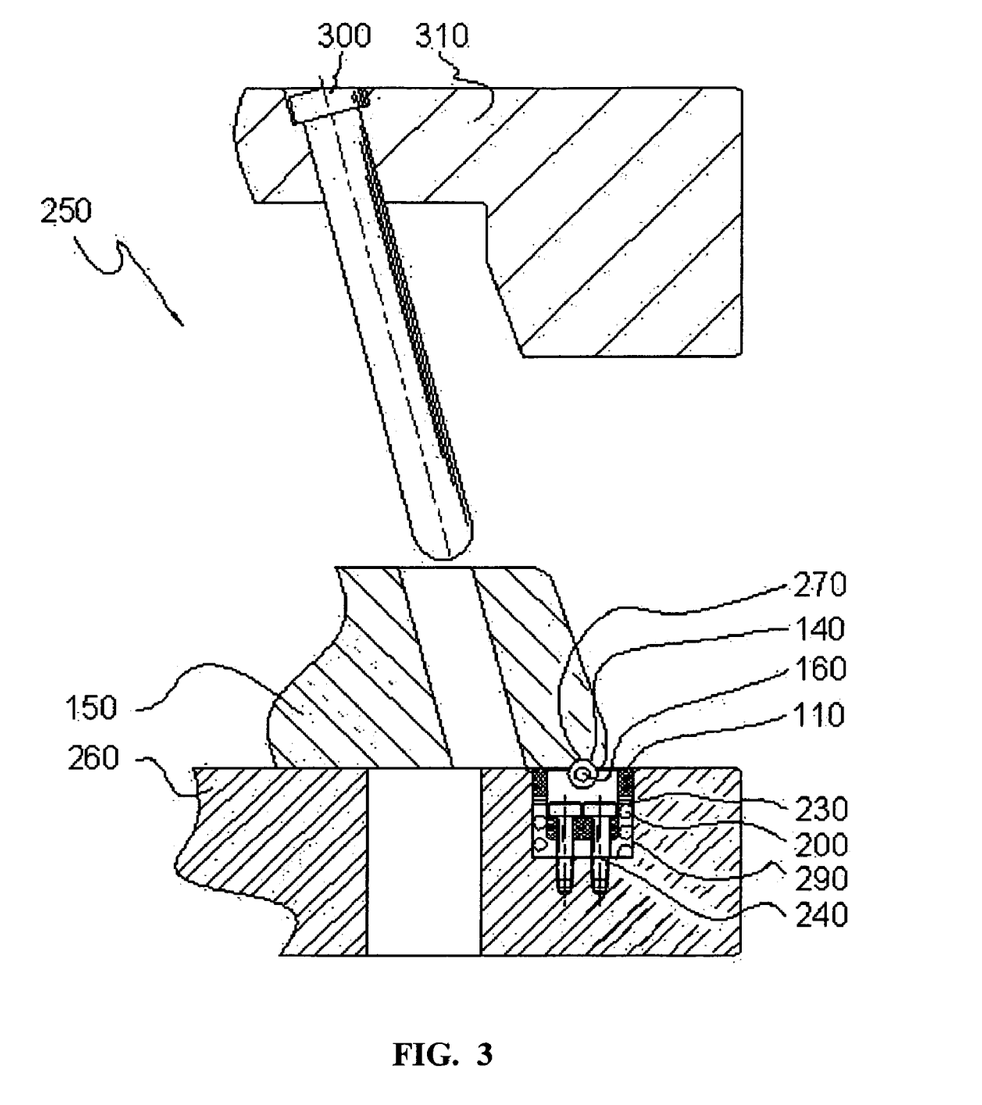
FIG. 3. shows a typical section view of an injection mold in the mold open position having a slide retaining device according to the present invention.

FIG. 3. shows a typical section view of an injection mold 250 in the mold open position having a slide retaining device 100 according to the present invention. In the mold open position, the slide 150 is laterally displaced such that the groove 270 releasable engages the slide retaining device 100. The amount of force required to engage and disengage the slide 150, via the groove 270, is dependent on the slide retaining device 100.

Figure 5:
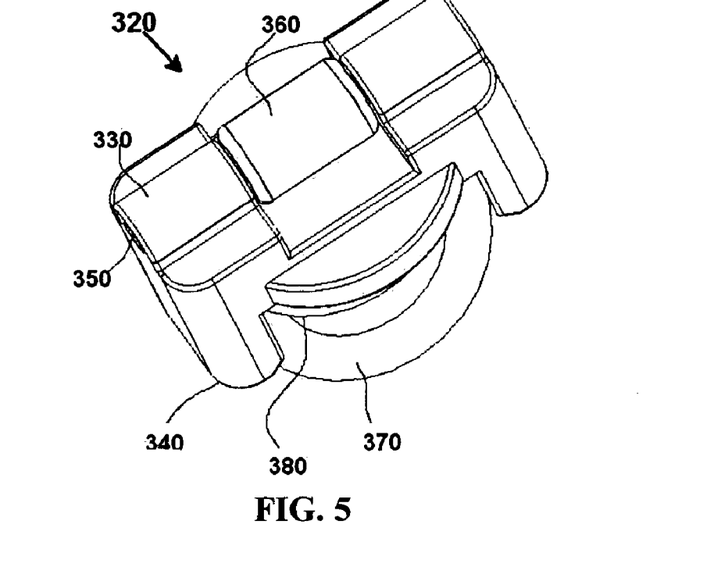
FIG. 5 shows a perspective view of a slide retaining device plunger according to present invention having a live bearing incorporated therein.

In other various embodiments, the present invention can be configured to retrofit or replace preexisting slide retainers. FIG. 5 shows a perspective view of a slide retaining device plunger according to present invention having a live bearing incorporated therein. In these embodiments, the plunger 320 is configured to replace the plunger from existing models of slide retainers. The plunger 320 has a top surface 330 and a bottom surface 340. The top surface 330 has raised rounded portions that hold an axle 350. A live bearing 360 is disposed on the axle 350. A spring 370 is used to create a "pre-load" force that will hold the slide 150 in place. The spring is placed between the bottom surface 340 and the flat bottom pocket 290. Optional washers 380 may be used to vary the "pre-load". Retrofitting of this type facilitates the use of the live bearing 360 without having to retool the injection molding machine.

Figure 6A:
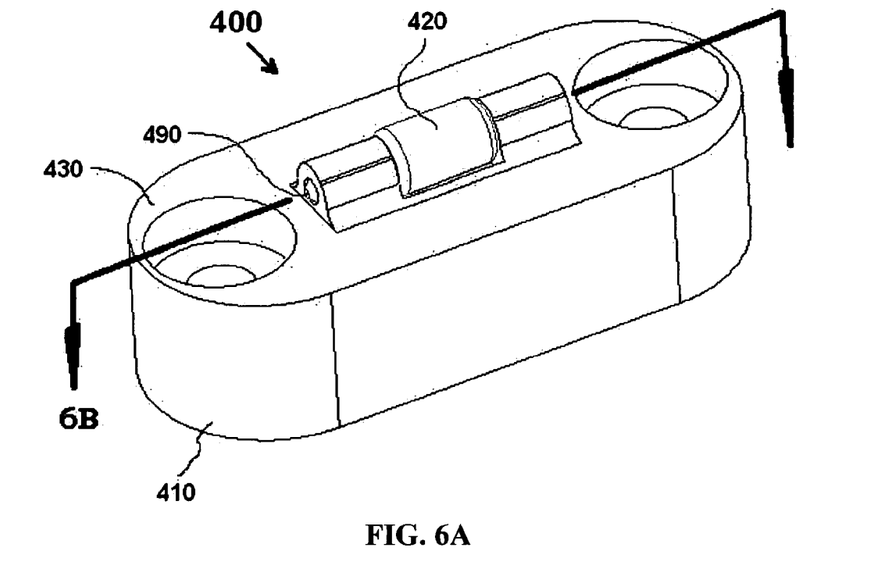
FIG. 6A shows a perspective view of an alternate embodiment of a slide retaining device according to present invention having a live bearing incorporated therein.
Figure 6B:
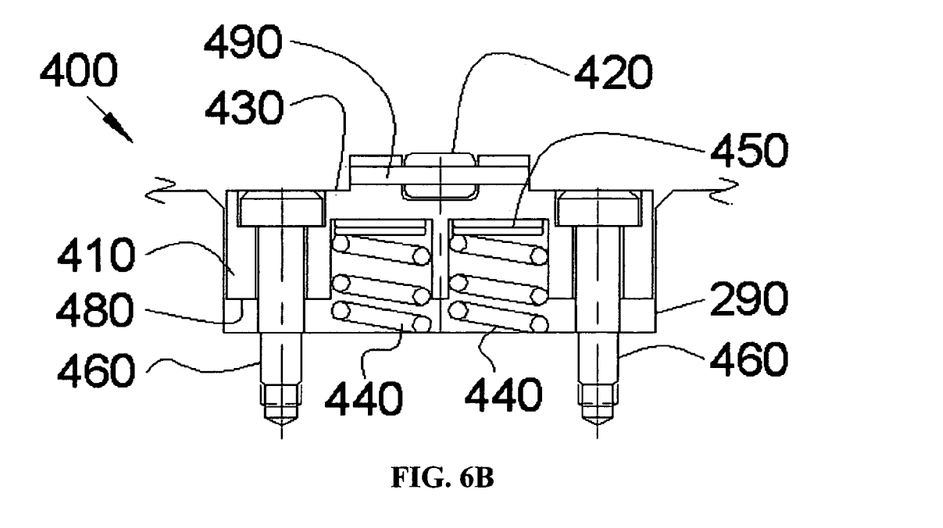
FIG. 6B shows a section view of an alternate embodiment of a slide retaining device according to present invention having a live bearing incorporated therein.

FIG. 6A shows a perspective view of an alternate embodiment of a slide retaining device according to present invention having a live bearing incorporated therein. FIG. 6B shows a section view of an alternate embodiment of a slide retaining device according to present invention having a live bearing incorporated therein. In this embodiment, the slide retaining device 400 is sized to replace an existing slide retainer. While the size and installation advantages of the previously described embodiments are not present, the advantages of a live bearing are present. Specifically, in the embodiment shown, the slide retaining device 400 has a device body 410 which has a live bearing 420 mounted in the device body such that a portion of the live bearing 420 extends above the top surface 430 of the device body 410. The device 400 is secured such that the live bearing 420 supports the travel of a slide 150. For example, one or more shoulder screws 460 can be used to secure the device 400. As discussed above, the live bearing 420 can be mounted on an axle 490. One or more springs 440 can be used to create a "pre-load" force that will hold the slide 150 in place. The spring or springs 440 are placed between the bottom surface 480 of the device 400 and the flat bottom pocket 290 into which the device 400 is installed. Optional washers 450 can be used to vary the "pre-load".

Figure 7A:
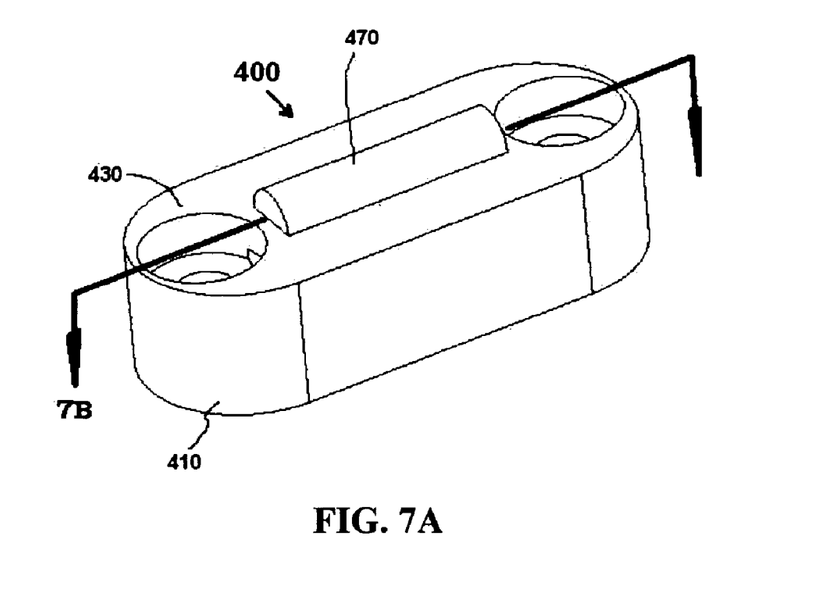
FIG. 7A shows a perspective view an alternate embodiment of a slide retaining device according to the present invention without a live bearing.
Figure 7B:
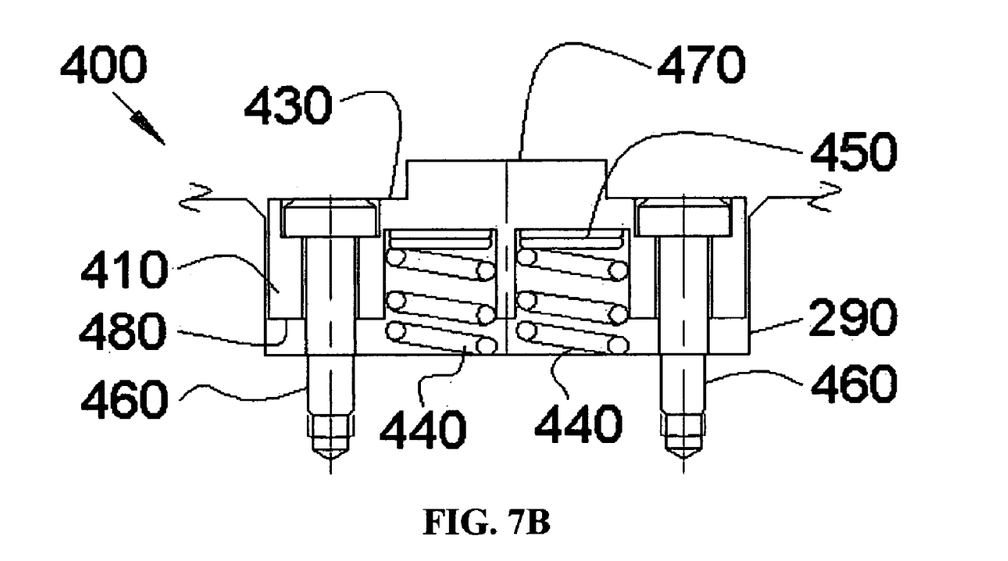
FIG. 7B shows a section view an alternate embodiment of a slide retaining device according to the present invention without a live bearing.

FIG. 7A shows a perspective view an alternate embodiment of a slide retaining device according to the present invention without a live bearing. FIG. 7B shows a section view an alternate embodiment of a slide retaining device according to the present invention without a live bearing.

Embodiments of this type again are sized to replace an existing slide retainer. The slide retaining device 400 has a device body 410. A contact surface 470 is formed into the top surface 430 of the device body 410. The device 400 is secured such that the contact surface 470 supports the travel of a slide 150. For example, one or more shoulder screws 460 can be used to secure the device 400. One or more springs 440 can be used to create a "pre-load" force that will hold the slide 150 in place. The spring or springs 440 are placed between the bottom surface 480 of the device 400 and the flat bottom pocket 290 into which the device 400 is installed. Optional washers 450 can be used to vary the "pre-load". While lacking the advantages of a live bearing, embodiments of this type have the advantage of a variable "pre-load" force.

Figure 8A:
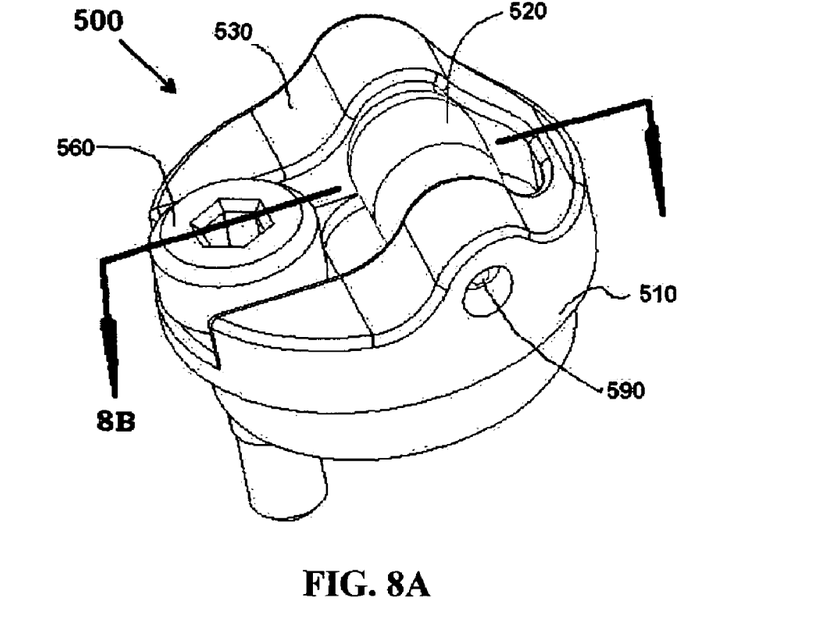
FIG. 8A shows a perspective view of another alternate embodiment of a slide retaining device according to the present invention.
Figure 8B:
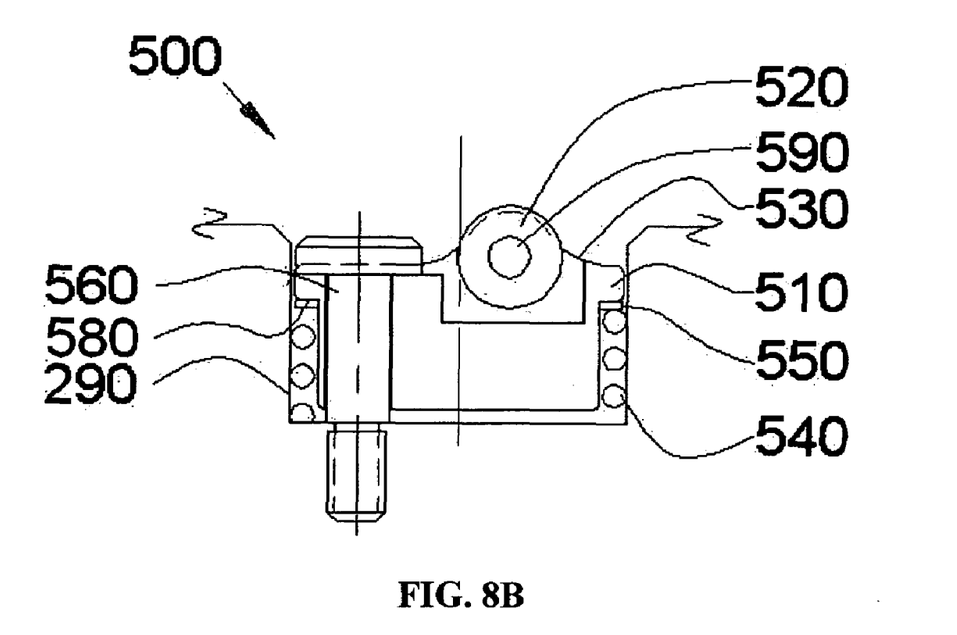
FIG. 8B shows a section view of another alternate embodiment of a slide retaining device according to the present invention.

FIG. 8A shows a perspective view of another alternate embodiment of a slide retaining device according to the present invention. FIG. 8B shows a section view of another alternate embodiment of a slide retaining device according to the present invention. Again, embodiments of this type may be sized to replace existing slide retainers. In the embodiment shown, the slide retaining device 500 has a device body 510 which has a live bearing 520 mounted in the device body such that a portion of the live bearing 520 extends above the top surface 530 of the device body 510. The device 500 is secured such that the live bearing 520 supports the travel of a slide 150. In the embodiment shown, one shoulder screw 560 can be used to secure the device 500. Preferably the shoulder screw 560 is off-center to the device body 510 to prevent the device from rotating during use. As discussed above, the live bearing 520 can be mounted on an axle 590. One or more springs 540 can be used to create a "pre-load" force that will hold the slide 150 in place. As shown, the springs 540 are placed between the shoulder surface 580 of the device body 510 and the flat bottom pocket 290 into which the device 500 is installed. Optional washers 550 can be used to vary the "pre-load".

While specific embodiments have been illustrated and described, numerous modifications come to mind without significantly departing from the spirit of the invention and the scope of protection is limited by the scope of the accompanying claims.

What is claimed is:

1. A slide retaining device comprising:
   a device body having a top surface and a bottom surface,
   a live bearing mounted in said device body, wherein a portion of said live bearing extends above said top surface of said device body,
   means for securing said device, wherein said live bearing supports travel of a slide,
   a spring, said spring in communication with said bottom surface of said device body,
   wherein said live bearing is a roller, and
   wherein said roller is mounted on an axle secured in said device body.

2. The slide retaining device according to claim 1, further comprising a washer in communication with said spring.

3. The slide retaining device according to claim 1, wherein said device body has a body base portion and a body head portion,
   wherein said body base portion has a first diameter,
   wherein said body head portion has a second diameter greater than said first diameter, and a shoulder surface formed where said body head portion interfaces with said body base portion, and
   said device further comprises a spring, said spring having a top and a bottom, wherein said spring is disposed around said body base portion, said spring top in communication with said shoulder surface of said body head portion, and said spring bottom extends below said bottom surface of said device body.

4. The slide retaining device according to claim 3, further comprising needle bearings between said axle and said roller.

5. The slide retaining device according to claim 1, wherein said securing means comprises at least one shoulder screw.

6. The slide retaining device according to claim 5, wherein said at least one shoulder screw is off-center to said device body.

7. The slide retaining device according to claim 1, wherein said securing means comprises at least two shoulder screws.

8. The slide retaining device according to claim 3, further comprising at least one washer disposed between said spring and said shoulder surface.

9. An injection mold comprising:
   a slide retaining device having a device body, said device body having a top surface and a bottom surface
   a live bearing mounted in said device body, wherein a portion of said live bearing extends above said top surface of device body,
   means for securing said device such that said live bearing supports travel of a slide,
   said device body has a body base portion and a body head portion,
   wherein said body base portion has a first diameter,
   wherein said body head portion has a second diameter greater than said first diameter, and a shoulder surface formed where said body head portion interfaces with said body base portion,
   said device further comprises a spring, said spring having a top and a bottom, wherein said spring is disposed around said body base portion, said spring top in communication with said shoulder surface of said body head portion, and said spring bottom extends below said bottom surface of said device body
   wherein said live bearing is mounted on an axle secured in said device body.

10. The injection mold according to claim 9, wherein said injection mold further comprises a core plate, and
    said slide retaining device being mounted in said core plate.

11. The injection mold according to claim 10, wherein said slide has a groove formed therein and said groove releasably engages said live bearing of said slide retaining device mounted in said core plate.

12. The injection mold according to claim 9, wherein said injection mold further comprises a core plate having a groove formed therein,
    wherein said slide retaining device is mounted in a slide of said injection mold, and
    wherein said groove in said core plate releasably engages said live bearing of said slide retaining device.

13. A method of installing a slide retaining device in an injection mold, comprising:
    creating a flat bottom pocket for said slide retaining device in a first portion of said injection mold,
    drilling and tapping holes for at least one shoulder screw in the bottom of said flat bottom pocket,
    placing said slide retaining device in said flat bottom pocket, securing said slide retaining device with said at least one shoulder screw, and creating a groove in a second portion of said injection mold, wherein said groove releasably engages said slide retaining device.

14. A slide retaining device having a plunger, said plunger comprising:

a plunger body having a top surface and a bottom surface, said top surface having raised rounded portions, wherein said raised rounded portions secure an axle having a live bearing disposed thereon, wherein a portion of said live bearing extends above said top surface of plunger body, and a spring in communication with said bottom surface.

15. The slide retaining device having a plunger according to claim 14, further comprising at least one washer in communication with said spring.

16. A slide retaining device plunger comprising:

a plunger body having a top surface and a bottom surface, said top surface having raised rounded portions, wherein said raised rounded portions secure an axle having a live bearing disposed thereon, wherein a portion of said live bearing extends above said top surface of plunger body, and a spring in communication with said bottom surface.

17. The slide retaining device plunger according to claim 16, further comprising at least one washer in communication with said spring.

* * * * *